United States Patent [19]

Kahn

[11] Patent Number: 4,796,160
[45] Date of Patent: Jan. 3, 1989

[54] POLARIZED LIGHTING PANEL

[76] Inventor: Myron Kahn, 4923 Amigo Ave., Tarzana, Calif. 91356

[21] Appl. No.: 119,908

[22] Filed: Nov. 13, 1987

[51] Int. Cl.$^4$ ............................ F21V 9/14; F21V 5/02
[52] U.S. Cl. .................................... 362/19; 362/268; 362/331; 362/339
[58] Field of Search .................. 362/19, 268, 331, 339; 350/96.19

[56] References Cited

U.S. PATENT DOCUMENTS

| | | | |
|---|---|---|---|
| Re. 26,506 | 12/1968 | Rogers | 362/19 X |
| 2,334,418 | 11/1943 | Land | 362/19 X |
| 3,772,128 | 11/1973 | Kahn et al. | 156/555 |
| 3,829,680 | 8/1974 | Jones | 362/339 |
| 3,876,285 | 4/1975 | Schwarzmuller | 362/19 X |
| 4,020,336 | 4/1977 | Linder | 362/19 |
| 4,372,656 | 2/1983 | Marks et al. | 362/19 X |

Primary Examiner—Ira S. Lazarus
Assistant Examiner—Peggy Neil
Attorney, Agent, or Firm—Beehler, Pavitt, Siegemund, Jagger, Martella & Dawes

[57] ABSTRACT

An improvement in a Radialens light control panel is comprised of the integral fabrication of a polarizing layer to the lowermost surface of the lighting panel opposing that surface of the Radialens panel in which a plurality of prismatic surfaces or lens elements is defined. The polarizing layer is laminated to the opposite surface of the Radialens panel after the Radialens panel is embossed and is still in a partially heated and plastic state. No adhesives are used to secure the bond between the polarizing layer and rear flat surface of the Radialens panel. The plurality of prisms or lenses defined in the opposing surface of the Radialens panel is embossed into the still plastic panel either immediately before or subsequent to the lamination with the polarizing sheet. As a result, polarized light is preferentially distributed to provide higher visual effectiveness and contrast, less reflective glare, increased visual comfort and less direct glare (VCP), than could be achieved with a Radialens panel along or from the polarizing sheet alone without the preferential distribution offered by the Radialens panel.

19 Claims, 1 Drawing Sheet

U.S. Patent   Jan. 3, 1989   4,796,160
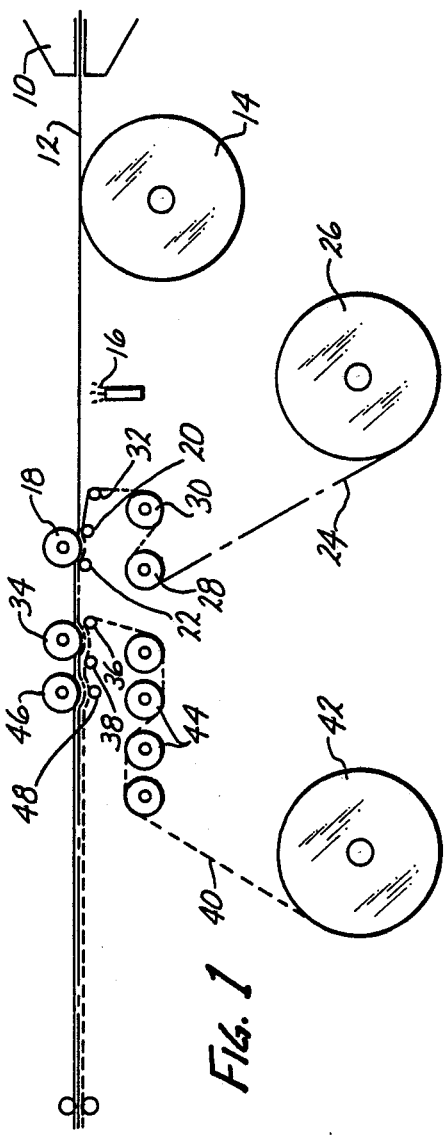
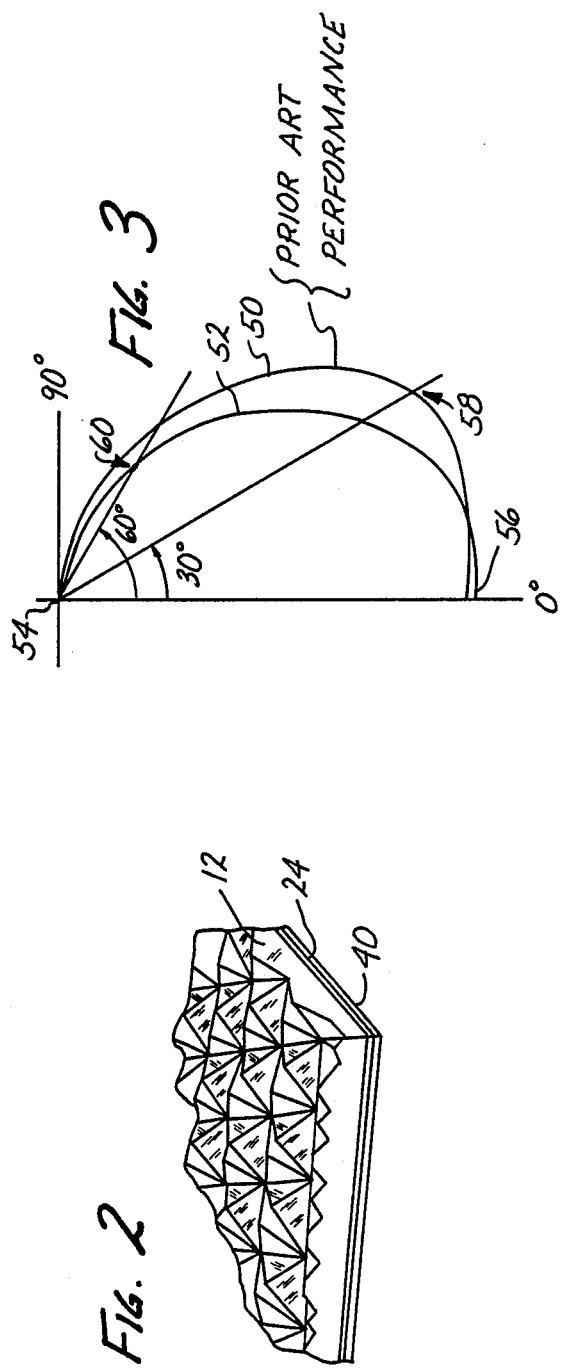

POLARIZED LIGHTING PANEL

BACKGROUND OF THE INVENTION

1. Field of the Invention

The invention relates to the field of lighting panels and in particular to panels for providing directed polarized illumination.

2. Description of the Prior Art

It has been appreciated by some researchers that visual effectiveness and visual acuity are a function both of the quality of the illumination employed to observe objects and detail as well as the intensity of illumination. In particular, it has been appreciated that the contrasts of observed objects are significantly more important than the intensity of the illumination to reflect things. For example, visual effectiveness is improved as much by a one percent increase in observed contrasts of objects as by an increase of fifteen percent of foot candle illumination intensity of the object. See H. Richard Blackwell, "A General Quantitative Method for Evaluating the Visual Significance of Reflected Glare, Utilizing Visual Performance Data", I.E.R.I. Project No. 70, LIGHTING, W.R.C. Smith Publishing Company.

It has also been appreciated by some that the reduction in the amount of direct glare at wide angles from the vertical from a source of illumination is increased more by multilayer polarizing panels than by conventional prismatic acrylic panels, glass diffuser panels or various type of light contoured panels. See Blackwell, supra.

It has also been determined by prior practitioners that in order to minimize glare reflected from on object, it is highly desirable to have light projected in a conical annulus defined between an inner cone at approximately thirty degrees from the vertical from an overhead light source to approximately sixty degrees from the vertical. Light impinging on an object, such as printed matter, above and slightly forward of a reader results in a considerable amount of reflection both from the black printed surface as well as the white surrounding paper. Thus, the normal contrast of printed matter is somewhat reduced and in the case of an extremely high illumination level, the printed matter may be totally unreadable. If the printed matter is illuminated from the side, direct reflection from the surface of the printed matter will not be directed to the eyes of the reader, but instead will be reflected away from the observer and, some of the light will be scattered and not reflected by the printed page. Some of the scattered light will be directed to the eye of the observer and light scattered from the white paper will be considerably different than light scattered from the black print and the contrast between the print and the paper will be largely undiminished.

However, in office or school settings where a ceiling is provided with a plurality of illumination panels, the lighting industry has devised a standard for visual comfort probability (VCP) which is a measure of the contribution of the various light sources to the subjective feeling of visual comfort or discomfort in the room. VCP is based upon investigations performed to find the borderline between between comfort and discomfort, which might be interpreted as the point at which fifty percent of the people in the room consider it comfortable and the other fifty percent do not. The worst position in the room is typically used to calculate the VCP in a room. The Illuminating Engineering Society has set a VCP of 70 as a practical guide to a minimum comfort level. Thus, VCP is a percentage of people who, when viewing from a specified location and in a specified direction, will be expected to find it acceptable in terms of discomfort glare from the light source.

It has been appreciated that the VCP which is required within buildings under arrays of illuminations panels can be better met if the illumination from each panel at high angles from the vertical is reduced, particularly if minimized at angles above sixty degrees from the vertical. JONES, "Lighting Panel", U.S. Pat. No. 3,829,680 (1974). A panel has been sold under the trademark, Radialens. This product produces maximum wide angle ditribution within rooms in all directions, but does not meet VCP's of 70 or more.

It has also been appreciated by some practitioners that when an object is viewed at any angle, a ray of light coming from a point in space will produce higher contrast when vertically polarized than when horizontally polarized. See Blackwell, supra. For this reason methodologies and materials have been developed for producing polarizing sheets as described in greater detail in KAHN, "Light Polarizing Structures", U.S. Pat. No. 3,124,639 (1964) and KAHN et al., "Machine for Continuously Producing Large Area Light Polarizing Panels", U.S. Pat. No. 3,772,128 (1973), which is incorporated herein by reference. These panels meet the VCP of 70 or more due to their low brightness polarizing effect at wide angles.

Therefore, the applicant has combined the prismatic structure of the JONES Radialens manufactured according to the methodologies and structures of KAHN's polarizing panel to obtain the higher visual acuity realized with polarized light with the wide angular light distribution of the Radialens panel and the desirable VCP of 70 or more into an integral structure. However, what is achieved is not merely the expected advantages of polarized and Radialens light distribution, but a marked improvement in visual comfort probability (VCP) due to a reduction of brightness and glare at wide angles.

BRIEF SUMMARY OF THE INVENTION

The invention is an improvement in a lighting panel including a light source and an embossed series of Radialens prisms on a surface comprising a layer or portion incorporated therein for preferentially polarizing the light transmitted through the panel at all angles around the panel. The under layer of the panel polarizes light incident on the surface of the panel which is then transmitted therethrough to the polarizing layers for preferentially distributing the light transmitted through the panel.

The layer for polarizing the light transmitted through the panel is an integrally formed layer of polarizing material disposed an lower surface of the panel furtherest away from the light source. The Radialens prisms for preferentially distributing the light at wide angeles are on the upper surface of the panel nearest the light source.

The invention is also more particularly described as an improvement in an integral lighting panel such as that sold by assignee under the trademark, Radialens. The panel has at least one shaped surface comprising a plurality of three-dimensional elements extending from the one surface and a surface opposing the one shaped surface. Each element is defined by three generally flat triangular surfaces. Each of the triangular surfaces has a first and second side, and a base, and further mates the other two of the three triangular surfaces defining each of the elements which are on the first and second sides of the element. Each of the bases of the three triangular surfaces which define each of the elements is substantially coincident with the base of one of the triangular surfaces defining an adjacent element. All of the bases are substantially coplanar. Each of the three triangular surfaces is disposed at approximately 50 to 60 degrees with respect to the plane of the bases. The improvement comprises at least a portion of the lighting panel being composed of a polarizing material so that light transmitted through the lighting panel and from the prismatic surface is substantially polarized.

In one embodiment the portion of the lighting panel composed of polarizing material is a backing layer adhered to the lower surface of the lighting panel opposing the upper surface having the plurality of three-dimensional elements.

More particularly the polarizing layer is always laminated to the opposing surface of the prismatic Radialens surface of the lighting panel.

In the illustrated embodiment the laminated polarizing layer is laminated to the panel while the lighting panel is heated and plastic, and is laminated to one opposing surface of the lighting panel without inclusion of adhesives.

In the preferred embodiment the plurality of three-dimensional elements are defined into the other surface of the lighting panel prior to thermal lamination of the polarizing layer to the opposing surface of the lighting panel.

The invention can also be characterized as an improvement in a lighting panel having in one surface thereof a plurality of three-dimensional elements defined by a first set of parallel, equally spaced V-grooves directed downwardly into the one surface of the lighting panel. A second set of parallel V-grooves is directed downwardly into the panel. The second set of V-grooves has the same spacing as the first set and crosses the first set at an angle of approximately 60 degrees. A third set of V-grooves is also directed downwardly into the panel. The third set of V-grooves has the same spacing as the first set and crosses the first and second sets at an angle of approximately 60 degrees. The first set and third sets of V-grooves are disposed so that the lines defined by junction of the two sides of each of the V-grooves are substantially coplanar. Each of the two sides of each of the V-grooves is disposed at approximately 50 to 60 degrees with respect to the plane of the lines defined by the junction of the two sides of each of the V-grooves. The one surface is opposed by a flat surface. The improvement comprises at least a portion of the lighting panel being composed of a polarizing material so that light transmitted through the lighting panel and through the surface into which the plurality of elements is defined, is transmitted through to the opposite surface and emitted as substantially polarized light distributed radially in all directions.

The invention is still further characterized as an improvement in a lighting panel having on one surface a pattern defined therein of a plurality of groups of three generally triangular surfaces. Each of the triangular surfaces has first and second sides and a base, and mates the other two of the three triangular surfaces on the first and second sides thereof. Each of the bases of the three triangular surfaces in a group is substantially coincident with the base of one of the triangular surfaces in an adjacent group. All of the bases are substantially coplanar. Each of the three triangular surfaces is disposed at approximately 50 degrees to 60 degrees with respect to the plane of the bases. The one surface has an unshaped opposing surface. The improvement comprises at least a portion of the lighting panel being composed of polarizing material so that light transmitted through the lighting panel from the Radialens prismatic surface, emerges from the other surface and is defined as substantially vertically plane polarized light emitted in all radial directions.

The invention and its various embodiments may be better visualized by referring to the following drawings wherein like elements are referenced with like numerals.

BRIEF DESCRIPTION OF THE DRAWINGS

FIG. 1 is a diagrammatic side view of a continuous feed process whereby the panels of the present invention are devised.

FIG. 2 is a perspective fragmentary view of a portion of a panel manufactured by the apparatus of FIG. 1.

FIG. 3 is a polargraph of the light intensity of a nonpolarized Radialens and conventional polarizing sheet as compared to a polarized Radialens according to the invention.

The present invention may be better understood in the illustrated embodiment by now turning to the following detailed description.

DETAILED DESCRIPTION OF THE PREFERRED EMBODIMENTS

An improvement in a Radialens light control panel results from the integration by fabrication of a light polarizing layer to a surface of the lighting panel opposing the surface of the Radialens panel in which a plurality of prismatic surfaces or lens elements is defined. The polarizing layer is laminated to the opposite surface of the Radialens panel after the Radialens panel has been embossed and is in a relatively heated and plastic state. No adhesives are used to secure the bond between the polarizing layer and other surface opposite the Radialens embossing. The plurality of prisms or lenses defined in the opposing surface of the Radialens panel is embossed into the plastic panel immediately before the lamination with the polarizing sheet. As a result, polarized light is preferentially distributed at wider and desirable angles to provide higher contrast and less reflective glare and lower direct source glare (VCP) than could be achieved with a Radialens panel alone or a polarizing sheet alone.

FIG. 1 is a side diagrammatic view of a continuous sheet process by which polarized light control panels may be devised according to the invention. The basic manufacturing process is described in greater detail in KAHN et al., supra. However, a modification to the apparatus and process is described below in connection with the other elements of the apparatus and process.

An extrusion die 10 exudes a hot plastic sheet 12 which is transported over a dry roller 14. Sheet 12 is typically between 200 and 280 degrees F., as controlled by the extrusion process and/or as modified by water cooled roller 14 or a cooling air jet 16. Sheet 12 is transported horizontally into the nip of a first set of laminating roller 18, 20 and 22. A polarizing material 24 in sheet form is supplied from a feed roll 26 around tensioning rollers 28 and 30 to a lead-off roller 32. Roller 32 is positioned relative to plastic sheet 12 as described in greater detail in KAHN et al., U.S. Pat. No. 3,772,128. Polarizing material 24 may be any polarizing material known to the art and in particular the polarizing material as described in detail in KAHN, "Light Polarizing Structures", supra.

The radiant heat within plastic 12 is sufficient to cause light polarizing sheet 24 to become adhered thereto without the necessity of introducing adhesives or other means of affixing polarizing sheet 24 and plastic sheet 12 together.

As the sheet of plastic 12 with light polarizing sheet 24 leaves the first set of laminating rollers 18-22, it is led to a second set of laminating rollers 34-38. A second plastic sheet 40 is supplied from feed roll 42 through a plurality of tensioning rollers 44 to laminating rollers 34-38.

At this point in the process polarized sheet 24 has been sufficiently heated by contact with plastic sheet 12 that a similar adhesion occurs between polarizing sheet 24 and second plastic sheet 40 as occurred between first plastic sheet 12 and polarizing sheet 24 when passed through laminating rollers 18-22.

The heated and relatively soft thermoplastic first emerges from the embossing rollers 46 and has the negative image of a prismatic pattern formed in its outer cylindrical surface which is impressed into first plastic sheet 12 as the laminate is fed through embossing rollers 46 and 48.

FIG. 2 is a fragmentary perspective view which shows a corner of the laminate as it would appear after being embossed by roller 46. First plastic layer 12, which is the thickest layer, has impressed therein a prismatic pattern which is described in greater detail in JONES, "Lighting Panel", supra, which is incorporated herein by reference. Beneath the now shaped plastic layer 12 is an undeformed polarizing layer 24 and the thin second plastic sheet 40, all of which has been formed into an integral laminate.

Thereafter, additional processing steps may be performed on the continuously moving laminated sheet 12, 24 and 40. The edges of the laminated sheet may be sealed by heated side bars as described in KAHN U.S. Pat. No. 3,772,128 and are then cooled thereby assuming a rigid and self-supporting form. The sheets may then be cut to size as appropriate.

FIG. 3 is an isocandela polargraph comparatively illustrating the performance of the prismatic Radialens sheet without a polarizing lens, indicated by curve 50 and the same prismatic Radialens sheet when integrally fabricated with a polarizing layer indicated by curve 52. The light source may be considered as sited at point 54 with the radial line extending from point 54, the origin, to curves 50 and 52 representing the intensity of the illumination in lumens as a function of its angle from the vertical. Thus, the nadir 56 is indicated as the point directly beneath light source 54 as zero degrees and thereafter increasing in intensity in the case of a Radialens as depicted in the curve 50 out to a zone and between thirty and sixty degrees indicated by reference numerals 58 and 60 in FIG. 3.

The performance of the polarized Radialens panel is indicated at curve 52 and shows a somewhat higher intensity at the nadir point 56, but with a good angular spread at wider angles between thirty and sixty degrees and even with lower intensities above sixty degrees than a Radialens without a polarizing component.

The Radialens without a polarizing component does not meet the visual comfort probability (VCP) required by the Illuminating Engineering Society of North America or by many State codes which require a VCP of 70 or more. For example, in one test the Radialens panel in a light fixture without the polarizing sheet in a 30×30 room with a ten-foot ceiling indicated a VCP of 65. However, when the Radialens is combined with a polarizing component in the same fixture and same room, the VCP surprisingly rises to 70-79. The Radialens with the polarized component thus meets industry VCP criteria, thus enabling the product to satisfy standardized performance specifications in many additional institutional building lighting applications, such as in school rooms and universities etc.

In addition thereto, the wide angle distribution of illumination characteristic of the Radialens panel without a polarizing component was substantially preserved when a polarizing component was included. What is not illustrated in FIG. 3 is the fact that the light transmitted through the improved Radialens acrylic panel according to the invention becomes polarized light after passing through the opposite layer which allows for substantially greater visual acuity, visual effectiveness and visual comfort (VCP) with lower lighting intensities, thus contributing to important electric conservation benefits in lighting applications.

In addition thereto, and further not depicted in FIG. 3, lamp image obscuration is significantly increased with the polarized Radialens without any decrease in visual efficiency as compared to a conventional Radialens. It is aesthetically desired to have the panel, when viewed from underneath, appear as a more uniform sheet of illumination. However, conventional panels typically fail to achieve this effect in that the conventional panel is most intensely lit in the close proximity of the overhead illuminating tube within the light fixture. While a conventional Radialens does serve to partially reduce the precise image of the illuminating tubes, the illumination panel is by no means uniformly lit. A polarizing component when included under the Radialens panel provides a more highly diffuse image acting in combination with the prismatic image redirected by the Radialens panel. The overall performance is significantly better than the Radialens panel without the polarizing component or as viewed simply through a conventional polarizing sheet alone.

Further, the combination of the Radialens panel with the polarized component reduces the light distribution directly beneath the light fixture, and hence reduces glare and increases the amount of polarized light which occurs at angles beyond 10 to 90 degrees as compared with a conventional polarizing sheet without this prismatic lens component.

As a result, a highly aesthetic polarized panel is provided which improves visual contrasts of observed objects and improves color differentiation by increasing the amount of the light absorption and decreasing the amount of horizontally polarized reflected glare. Such glare, as is inherent in and present under conventional prismatic and diffused lighting, tends to wash out color distinctions, detail and contrasts. Furthermore, because of the wilder illumination distribution realized by a polarized Radialens as compared with a conventional fixture spacing of 1.7 to 1.2, the number of lighting fixtures per foot within an interior space may be reduced or alternatively the average number of illumination tubes within each fixture may be reduced with corresponding reduction in power consumption without any corresponding loss in visual acuity, visual effectiveness or increase in visual discomfort.

Further, a polarized Radialens according to the present invention is manufactured in a continuous sheet feed process as a laminated integral unit and there is no requirement nor can it be duplicatd by simply providing an extra polarizing back panel laid upon a conventional Radialens panel. Such back panels are typically thicker than the polarizing layer which can be laminated integrally within a polarized Radialens sheet since such back panels must also be structurally rigid to allow handling. Secondly, even if cost were not a consideration, merely fitting a polarized back panel to a conventional Radialens panel fails to provide uniform clearance between the panels or requires a time consuming and difficult hand lamination in the field which can rarely bring satisfactory results in practice and would substantially increase cost. The salutorious performance which is described and illustrated in FIG. 3 cannot be duplicated by merely placing a polarizing back panel on a Radialens sheet.

Many modifications and alterations may be made by those having ordinary skill in the art without departing from the spirit and scope of the invention. Therefore, it must be understood that the illustrated embodiment has been set forth only for the purposes of example and it should not be taken as a limitation of the invention as defined in the following claims.

I claim:

1. An improvement in an laminated lighting panel having a first layer with at least one shaped surface comprising a plurality of three-dimensional elements extending from said one surface and a surface opposing said one shaped surface, each element defined by three generally flat triangular surfaces, each of said triangular surfaces having first and second sides and a base, and mating the other two of said three triangular surfaces defining each of said elements on said first and second sides of said element, each of said bases of said three triangular surfaces defining each of said element being substantially coincident with the base of one of said triangular surfaces defining an adjacent element, all of said bases being substantially coplanar, each of said three triangular surfaces being disposed at approximately 50 to 60 degrees with respect to the plane of said bases.

said improvement comprising a second layer laminated to said first layer and composed of a foamed laminated polarizing material having formed therein a multiplicity of flattened plastic bubbles so that light transmitted through said second layer, first layer and then through said shaped surface of said first layer is substantially polarized through a corresponding multiplicity of optical interfaces formed by said bubbles and said multiply polarized light is refracted through said shaped surface to distribute said light at wide angles from the vertical with a VCP of substantially equal or greater than 70.

2. The improvement of claim 1 wherein said portion of said lighting panel being composed of polarizing material is a layer adhered to said surface of said lighting panel opposing said one surface having said plurality of three-dimensional elements defined therein.

3. The improvement of claim 2 wherein said polarizing layer is laminated to said opposing surface of said lighting panel and wherein said plurality of three-dimensional elements are embossed into said one surface.

4. The improvement of claim 3 wherein said laminated polarizing layer is laminated to said lighting panel while said lighting panel is heated and plastic and is laminated to said opposing surface of said lighting panel without inclusion of adhesives.

5. The improvement of claim 4 wherein said plurality of three-dimensional elements are defined into said one surface of said lighting panel subsequent to thermal lamination of said polarizing layer to said opposing surface of said lighting panel.

6. The improvement of claim 4 wherein said plurality of three-dimensional elements are defined into said one surface of said lighting panel prior to thermal lamination of said polarizing layer to said opposing surface of said lighting panel.

7. An improvement in a lighting panel having in one surface of a first layer thereof a plurality of three-dimensional elements defined by a first set of parallel, equally spaced V-grooves directed downwardly into said one surface of said lighting panel, a second set of parallel V-grooves directed downwardly into said panel, said second set of V-grooves having the same spacing as said first set and crossing said first set at an angle of approximately 60 degrees, and a third set of V-grooves directed downwardly into said panel, said third set of V-grooves having the same spacing as said first set and crossing said first and second sets at an angle of approximately 60 degrees, said first set and third sets of V-grooves being disposed so that the lines defined by junction of the two sides of each of said V-grooves are substantially coplanar, each of said two sides of each of said V-grooves being disposed at approximately 50 to 60 degrees with respect to the plane of said lines defined by the junction of the two sides of each of said V-grooves, said one surface being opposing by a flat surface, said improvement comprising a second layer laminated to said first layer and composed of a foamed laminated polarizing material having formed therein a multiplicity of flattened plastic bubbles formed so that light transmitted through said second layer, first layer and then through said shaped surface of said first layer is substantially polarized through a corresponding multiplicity of optical interfaces formed by said bubbles and said multiply polarized light is refracted through said shaped surface to distribute said light at wide angles from the vertical with a VCP of substantially equal or greater than 70.

8. The improvement of claim 7 wherein said portion of said lighting panel being composed of polarizing material is a backing layer adhered to said flat surface of said lighting panel opposing said one surface having said plurality of three-dimensional elements defined therein.

9. The improvement of claim 8 wherein said polarizing layer is laminated to said opposing flat surface of said lighting panel.

10. The improvement of claim 9 wherein said laminated polarizing layer is laminated to said lighting panel while said lighting panel is heated and plastic and is laminated to said opposing flat surface of said lighting panel without inclusion of adhesives.

11. The improvement of claim 10 wherein said plurality of three-dimensional elements are defined into said one surface of said lighting panel subsequent to thermal lamination of said polarizing layer to said opposing flat surface of said lighting panel.

12. The improvement of claim 10 wherein said plurality of three-dimensional elements are defined into said one surface of said lighting panel prior to thermal lamination of said polarizing layer to said opposing flat surface of said lighting panel.

13. An improvement in a lighting panel having on one surface of a first layer a pattern defined therein of a plurality of groups of three generally triangular surfaces, each of said triangular surfaces having first and second sides and a base, and mating the other two of said three triangular on said first and second sides thereof, each of said bases of said three triangular surfaces in a group being substantially coincident with the base of one of said triangular surfaces in an adjacent group, all of said bases being substantially coplanar, each of said three triangular surfaces being disposed at approximately 50 degrees to 60 degrees with respect to the plane of said bases, said one surface having an unshaped opposing surface, said improvement comprising:

at least a portion of said lighting panel being composed of polarizing material, so that light transmitted through said groups of triangular surfaces of said lighting panel and into said polarizing material emerges from said polarizing material as substantially vertically polarized light, the axis of polarization being nonhorizontal to the surface of said polarizing material from which said light emerges, and;

a second layer laminated to said first layer and composed of a foamed laminated polarizing material having formed therein a multiplicity of flattened plastic bubbles formed so that light transmitted through said second layer, first layer and then through said shaped surface of said first layer is substantially polarized through a corresponding multiplicity of optical interfaces formed by said bubbles and said multiply polarized light is refracted through said shaped surface to distribute said light at wide angles from the vertical with a VCP of substantially equal or greater than 70.

14. The improvement of claim 13 wherein said portion of said lighting panel being composed of polarizing material is a backing layer adhered to said unshaped surface of said lighting panel opposing said one one surface having said plurality of three-dimensional elements defined therein.

15. The improvement of claim 14 wherein said polarizing layer is laminated to said opposing unshaped surface of said lighting panel.

16. The improvement of claim 15 wherein said laminated polarizing layer is laminated to said lighting panel while said lighting panel is heated and plastic and is laminated to said opposing unshaped surface of said lighting panel without inclusion of adhesives.

17. The improvement of claim 16 wherein said plurality of three-dimensional elements are defined into said one surface of said lighting panel subsequent to thermal lamination of said polarizing layer to said opposing surface of said lighting panel.

18. The improvement of claim 16 wherein said plurality of three-dimensional elements are defined into said one surface of said lighting panel prior to thermal lamination of said polarizing layer to said opposing surface of said lighting panel.

19. An improvement in a lighting panel/fixture including a light source comprising:

first means incorporated therein for preferentially distributing the light transmitted through said panel/fixture away from angles at and near the vertical directly beneath said panel/fixture and away from angles at and near parallel to the surface of said panel/fixture; and second means disposed within said panel/fixture on said first means, said second means for polarizing light incident on said panel/fixture to be transmitted therefrom as vertically plane polarized light at wide angles wherein said second means for polarizing said light transmitted through said panel/fixture is a layer of polarizing material disposed on a lower surface of said panel/fixture furthest away from said light source, said first means for preferentially distributing said light defined in an opposing upper surface of said panel/fixture, said layer laminated to said first means and composed of a foamed laminated polarizing material having a multiplicity of flattened plastic bubbles formed therein so that light transmitted through said second means and through said first means is substantially polarized through a corresponding multiplicity of optical interfaces formed by said bubbles, said multiply polarized light being refracted through said first means to distribute said light at wide angles from the vertical with a VCP of substantially equal or greater than 70.

* * * * *